Jan. 15, 1946.  A. R. LYTLE ET AL  2,392,824
PRESSURE WELDING PROCESS AND APPARATUS
Filed Aug. 3, 1940  10 Sheets-Sheet 2

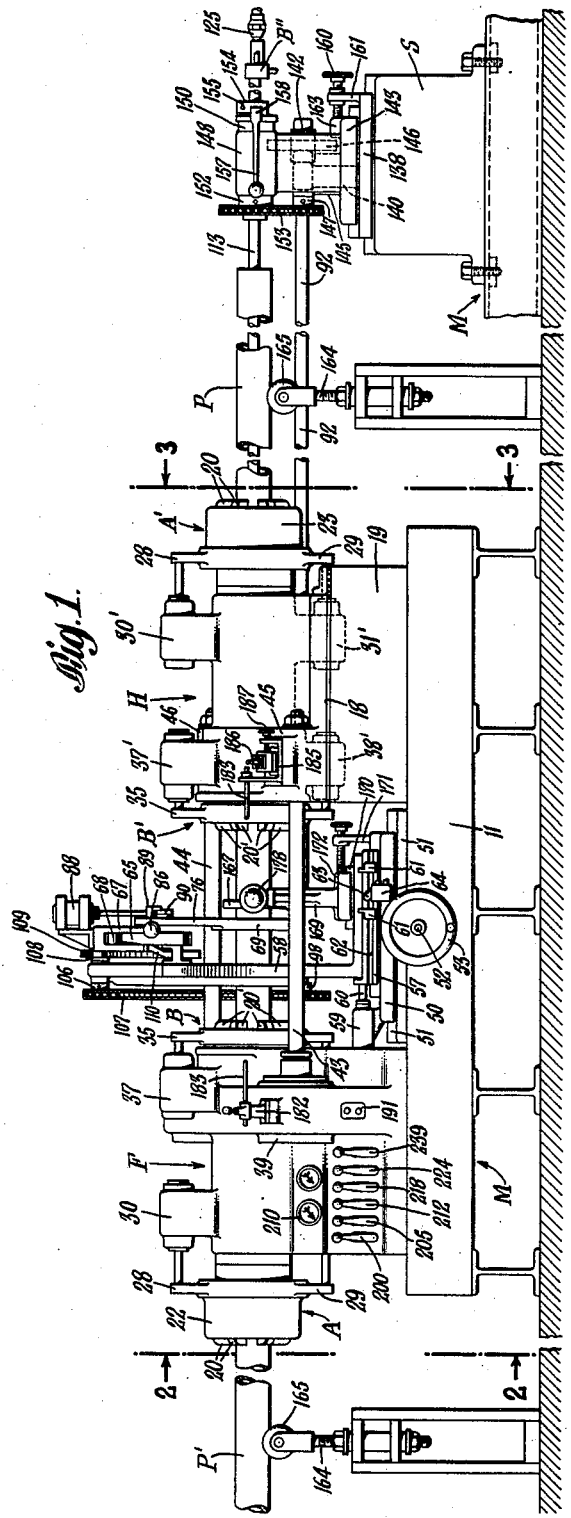

INVENTORS
ARTHUR R. LYTLE
WILLIAM MORTON
BY
ATTORNEY

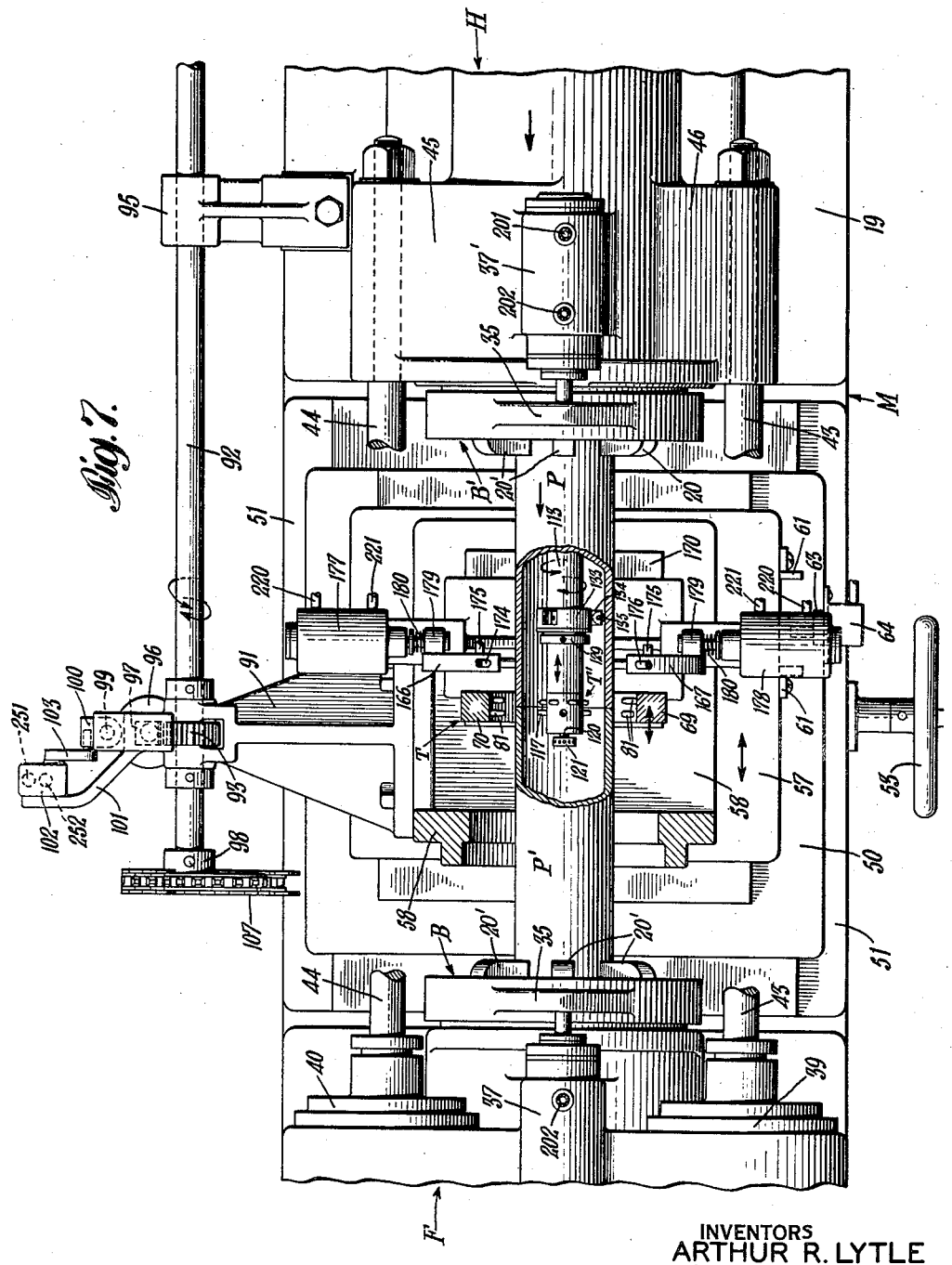

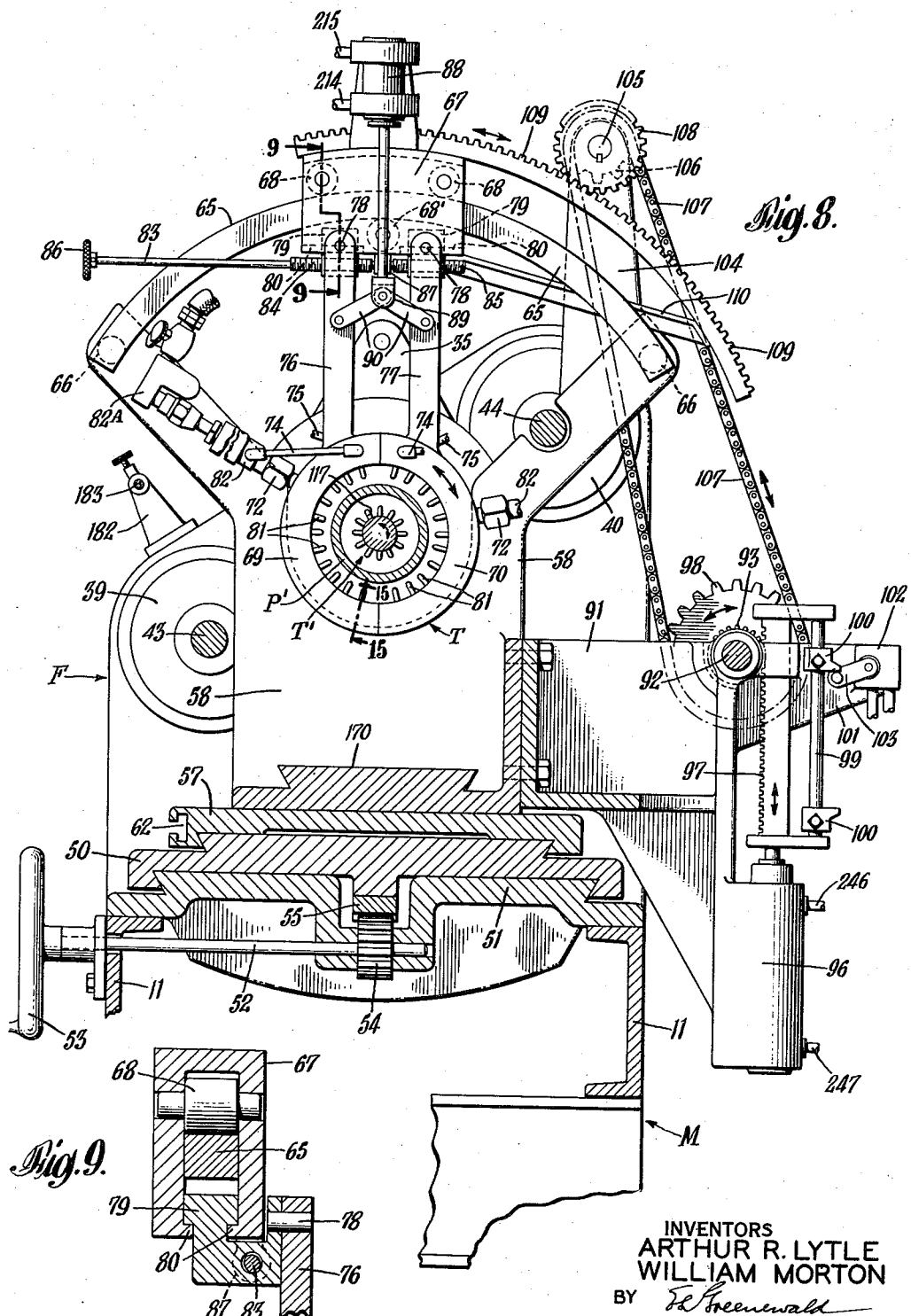

Jan. 15, 1946.  A. R. LYTLE ET AL  2,392,824
PRESSURE WELDING PROCESS AND APPARATUS
Filed Aug. 3, 1940  10 Sheets-Sheet 5

INVENTORS
ARTHUR R. LYTLE
WILLIAM MORTON
BY
ATTORNEY

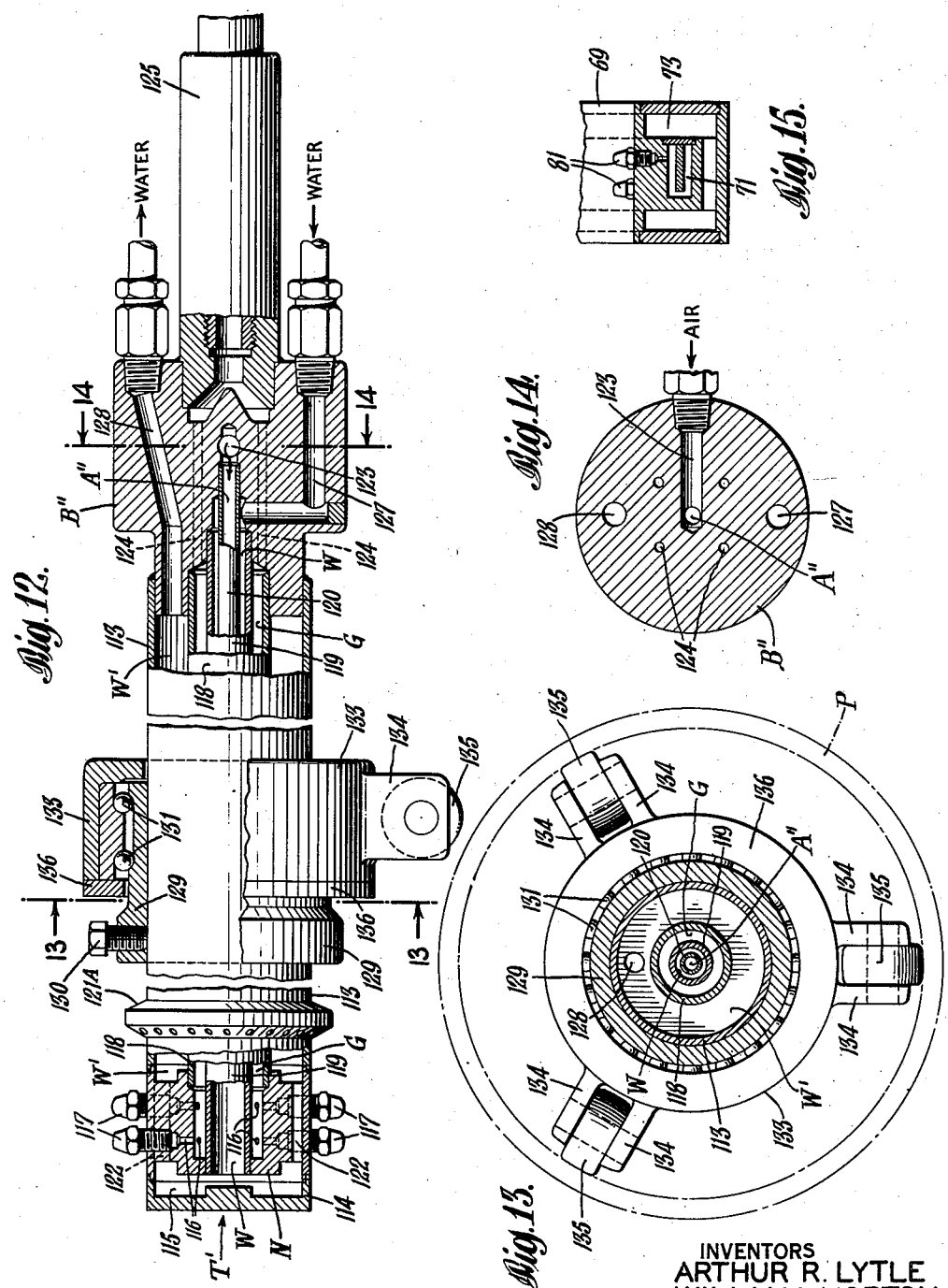

INVENTORS
ARTHUR R. LYTLE
WILLIAM MORTON
BY
ATTORNEY

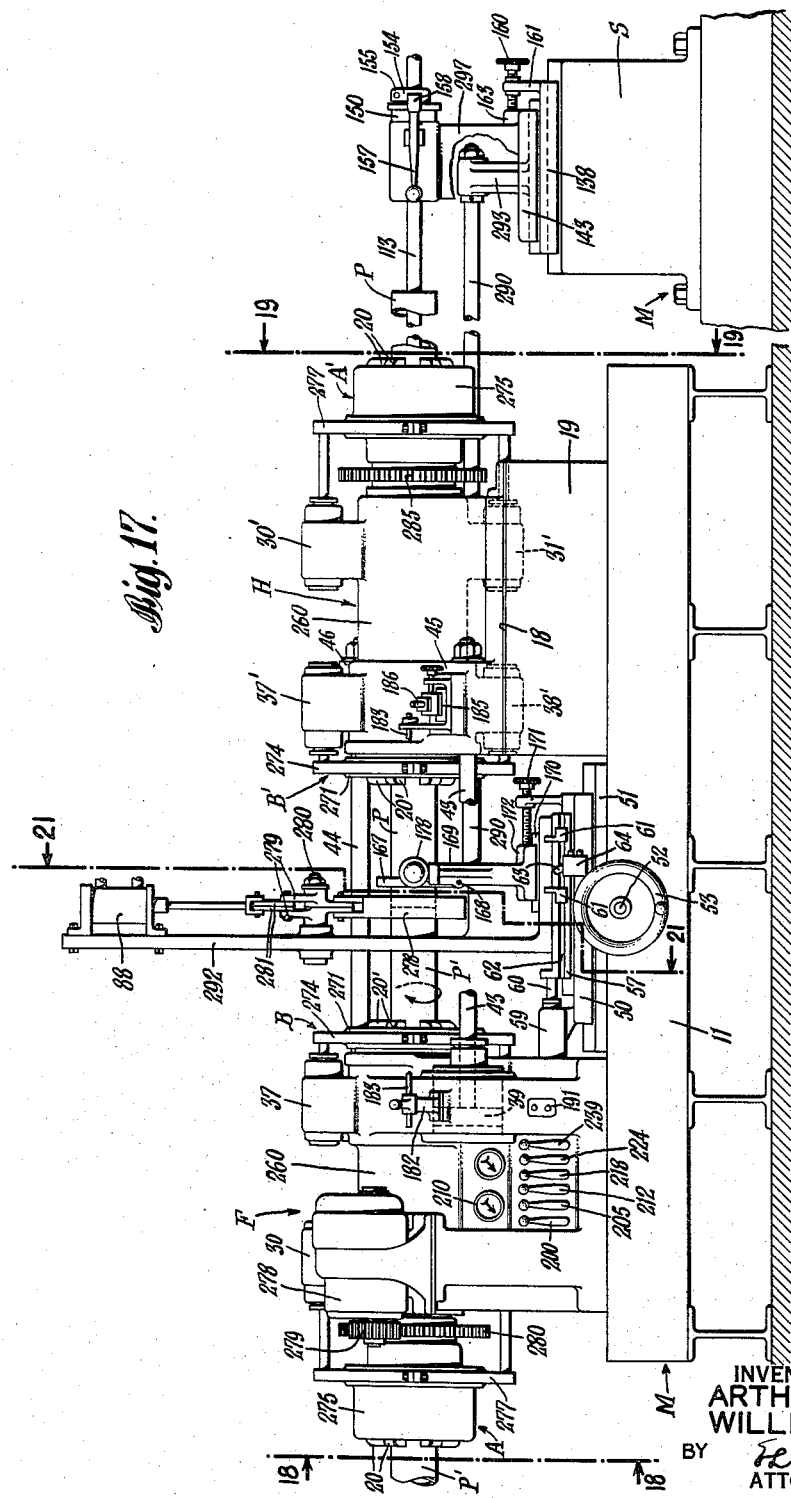

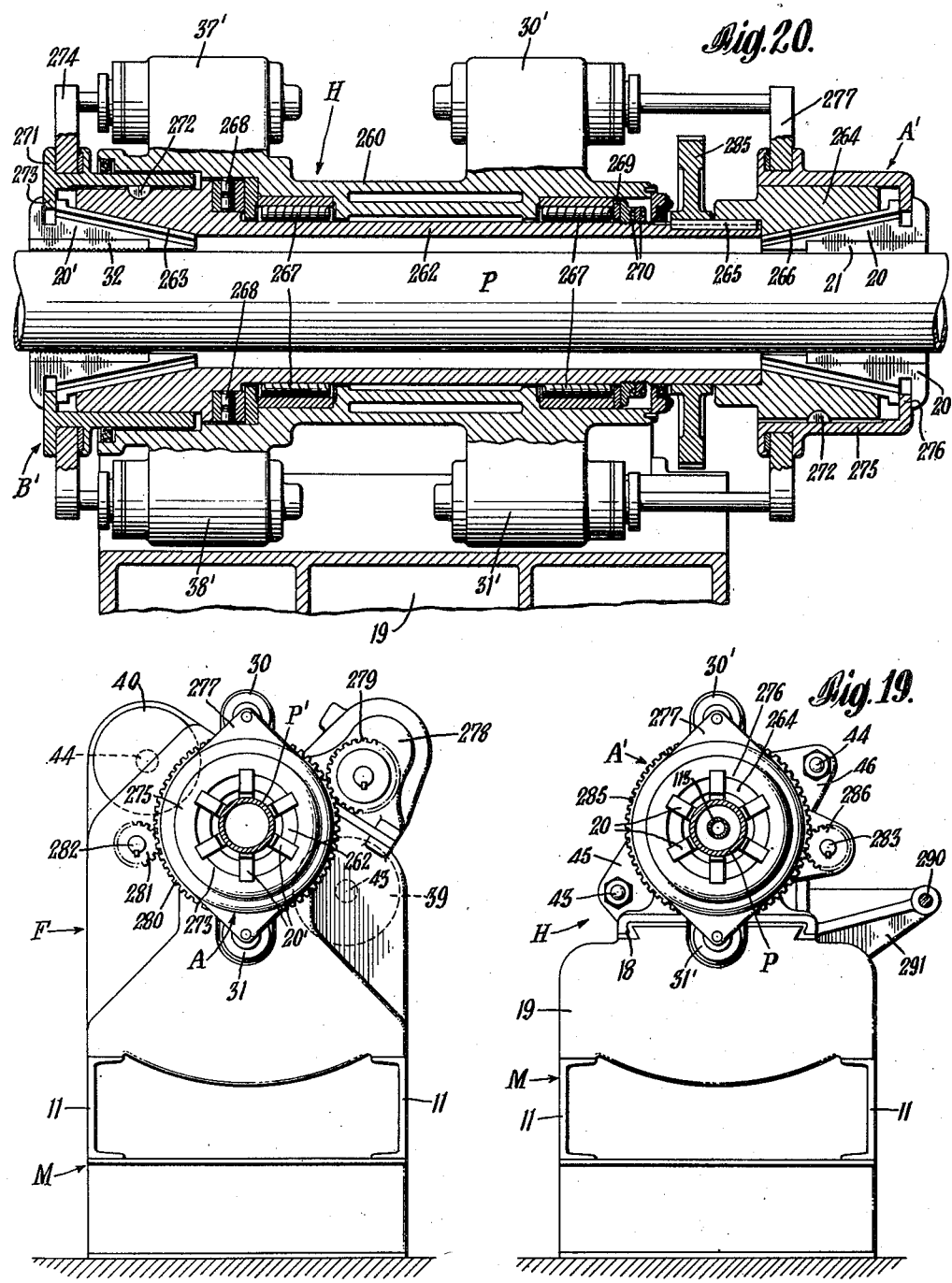

Patented Jan. 15, 1946

2,392,824

UNITED STATES PATENT OFFICE 2,392,824

PRESSURE WELDING PROCESS AND APPARATUS

Arthur R. Lytle and William Morton, Niagara Falls, N. Y., assignors, by mesne assignments, to The Linde Air Products Company, a corporation of Ohio Application August 3, 1940, Serial No. 350,680

20 Claims. (Cl. 78—84)

This invention relates to the pressure butt-welding of tubular and other metal members; and more especially it concerns a process and apparatus for the production of continuous welded metal structures of great strength from members having surfaces of the general shape of surfaces of revolution, preferably using oxy-acetylene or other gas welding flames for applying welded heat. The invention has especial utility in connection with the pressure butt-welding of pipe and like tubular members end to end into continuous lengths; and in connection with the end to end butt-welding of short tubular members to other members of the same or different diameter and wall thickness, as in the welding of one-half tool joints to oil well drill pipes. However, certain novel features of the invention have important value in connection with the pressure butt-welding of metal plates, bars, and other shaped articles of ferrous metals, non-ferrous metals and alloys.

Processes now are known for butt-welding tubular members while the abutting ends thereof are forced together under pressure. Such processes possess the advantage that the time required for completion of the weld is little affected by the diameter of the pipe or tubing. No welding rods or additional filler metal of any kind is required, thus insuring a uniform metal composition in the welded joint.

The industrial application of pressure butt-welding procedures for the welding of pipes and the like has been hindered because, in processes heretofore available, upon application of oxy-fuel gas flames to the outer surfaces of the pipes at the interface formed by the abutting ends, a tendency exists for the metal at the outer surfaces to overheat before that at the inner surfaces has reached a welding temperature. This tendency is more marked, and is more difficult to remedy, as the wall thickness of the tubular members increases.

In order to heat uniformly the abutting ends of two square-faced tubular members of one-half inch wall thickness or greater, by heat applied alone to the external surfaces of the members, it often is necessary to heat a wider zone on such surface than is desirable before the metal at the interior of such members reaches a suitable welding temperature. Thus, the heated zone subject to upsetting during the welding operation is unduly increased. This tends to cause the formation of objectionable and irregular contours on the members adjacent the welded joint.

Among the more important objects of the invention are: to provide, in novel manner, in a pressure butt-welding operation, for supplying welding heat to metal members uniformly for a selected distance on either side of the interface between abutting members; to provide, in novel manner, in a pressure butt-welding operation for applying welding heat uniformly throughout the entire thickness of metal at the abutting ends being joined; to provide, in novel manner, for preventing over-heating of the metal at the abutting ends, irrespective of the wall thickness of the respective members being welded; to provide for limiting the zone of upset metal adjacent the abutting ends of tubular members being welded; to provide for controlling a pressure butt-welding operation in accordance with the extent of shortening of the members resulting therefrom; and to provide for pressure butt-welding tubular members having walls of different thicknesses, while preventing objectionable flaring of upset metal in the member of thinner section. Other objects will be apparent as the following description proceeds.

The process will be described in connection with the preparation of continuous lengths of pipe. Preferably the pipe ends are prepared for the welding step by a grinding, machining or equivalent cleaning and smoothing operation. A chemical treatment to remove the oxide film may suffice in the case of new pipe. Generally the machining or grinding of the pipe ends, when employed, is such that, when the pipes are placed end to end, the abutting faces will not be separated by more than 0.01 inch. The pipe sections then are aligned with their prepared ends in abutting relation, and are forced together under a high pressure of over 300 pounds per square inch applied axially thereof. Generally, pressures within the range between 1500 and 2500 pounds or more per square inch are used. Welding heat then is applied to the abutting ends, as hereinafter described, while maintaining such pressure.

Throughout the application of the welding flames, the high pressure forcing the pipe ends together preferably is maintained. The length of the heated zone, the rate and distribution of heat flowing thereto, both from within and from without the pipes, and the pressure applied, are so regulated that lateral misalignment of the pipes during welding is prevented, and the extent and location of the zone of upset metal is closely controlled.

Metal upset by the welding operation may subsequently be removed from the external surface of the joint in well-known manner by a grinding or cutting operation. It is preferred, however, to accomplish this by a flame-desurfacing operation immediately following the welding step, and while the welded joint still retains heat from the welding operation, as described in the U. S. Patent No. 2,231,014 of A. R. Lytle, W. Morton and L. V. Spangberg for "Welding process and apparatus," issued February 11, 1941.

The welded joint thereafter preferably is annealed by a suitable heat treatment. The latter may be conducted at temperatures around 900° C., while reciprocating across the welded joint a plurality of heating flames surrounding the pipes at the joint. When the members forming the joint have the same diameter and wall thickness, such reciprocation preferably is effected uniformly over a fixed path extending for a selected distance on either side of the joint, and somewhat greater in length than twice that employed in the welding operation.

The metal at the interface between abutting pipe ends is brought to a welding temperature by heat directed concurrently upon the exposed inner and outer peripheries of the abutting pipe ends adjacent the interface, preferably by separately-controlled torch assemblies disposed, respectively, around the outer peripheries of the pipes and centrally within the pipes adjacent the abutting ends. All parts of the contacting surfaces at the interface are heated quickly to a selected welding temperature, preferably no higher than the solidus temperature of the metal—and ordinarily within the range between 1000° C. and around 1300° C.—by heat conducted thereto through the pipe metal. As sources of welding heat, oxy-fuel gas mixtures having reducing characteristics are preferred, although other means providing suitable welding heat may be employed.

During the welding operation each torch assembly is reciprocated back and forth across the joint longitudinally of the pipes. Both the length of the path of reciprocation and the rate of reciprocation preferably are maintained uniform during a welding operation, and are regulated in accordance with such factors as the composition of the pipe metal, the wall thicknesses of the respective pipes, the adjustment of the respective torches, the amount of metal upset desired, and the pressure applied during the welding operation. Such reciprocation of the torches prevents local over-heating of the metal and insures the heating of the abutting ends within a zone of selected length on each side of the interface.

As the end surfaces of the abutting pipe sections reach the welding temperature, the metal in this heated zone becomes slightly plastic, and the pressure upsets the metal, forcing such end surfaces together to provide a welded joint of great strength. Particularly strong, tough welds of high quality are secured when the inner and outer welding flames are reciprocated across the joint along paths ranging from one inch to three inches in total length. When welding pipe section of the same diameter and wall thickness, the zone of reciprocation is disposed equally on opposite sides of the interface between the abutting pipes.

It is generally desirable to effect during the welding operation a relative rotational movement between the members being welded and the respective inner and outer torch assemblies about the common longitudinal axis of said members, in order to prevent the formation of local hot spots by individual torches or torch tips. This has been accomplished, in certain forms of the invention, by oscillating or rotating the respective torch assemblies as a unit at a selected rate along a path at least as long as the space between adjacent torch tips. In other modifications, the abutting pipe sections may be rotated or oscillated as a unit, at a uniform selected rate—for example, a rate of around 30 to 50 revolutions per minute—in which case the torches may remain stationary. In each modification relative movement is effected between the abutting pipe sections and the respective torch assemblies along a curved path coaxial with the axis of the pipe.

When butt-welding tubular members, one of which has a wall thickness and/or outer diameter greater than the other, it generally is preferred to direct the welding flames entirely upon the member of greater wall thickness until the same reaches a dull red heat, after which the centers of reciprocation of the inner and outer torch assemblies are shifted gradually toward the interface between the abutting ends, to equalize the temperatures in the respective members at the interface, at least until upsetting of metal occurs. The centers of reciprocation then may be shifted to maintain them at the interface between the abutting members.

An important feature of the invention concerns the accurate control during the welding operation of the amount of upset metal formed, and of the length of the zone wherein the upsetting occurs. The extent of such upsetting has an important bearing upon the quality of the welded joint produced. The latter generally is satisfactory where the upsetting—or total shortening of the pipes at the joint—is of the order of from 0.5 inch to around 1.5 inches.

In a preferred practice of the invention the degree of upset is used to control the welding operation; and the welding flames are cut off by automatic means when a selected shortening of the pipes at the joint has occurred.

A tendency exists during pressure welding of certain types of tubular members, especially where the respective members have different wall thicknesses, for the member of lesser wall thickness to fold or bend out of alignment and cause sagging or flaring adjacent the joint. This undesirable deformation is substantially prevented by selectively cooling the zone subject to such deformation. This may be effected by passing air, water, or other cooling medium in heat-exchange relation with the member of lesser wall thickness adjacent the interface. Preferably water-cooled metal rings, coils, or the equivalent, indirect heat-exchange means as hereinafter described, are utilized. As a result, the welding flames are deflected and prevented from flowing around the surface of the members at such cooling rings, thus limiting the extent of the heated zone, permitting control of the nature and extent of the upsetting, and substantially eliminating eccentric upsetting of metal.

In the accompanying drawings, illustrating certain modifications of the invention, Fig. 1 is a side elevation of one form of butt-welding apparatus, parts being omitted, and parts being broken away;

Fig. 2 is a section taken along the line 2—2 of Fig. 1, parts being omitted;

Fig. 3 is a section taken along the line 3—3 of Fig. 1, parts being omitted;

Fig. 4 is a fragmental view of a clamping assembly, parts being broken away;

Fig. 7 is a plan view of a midportion of the apparatus taken along the line 7—7 of Fig. 5, parts being omitted, and parts broken away;

Fig. 8 is a section taken along the line 8—8 of

Figure 5:
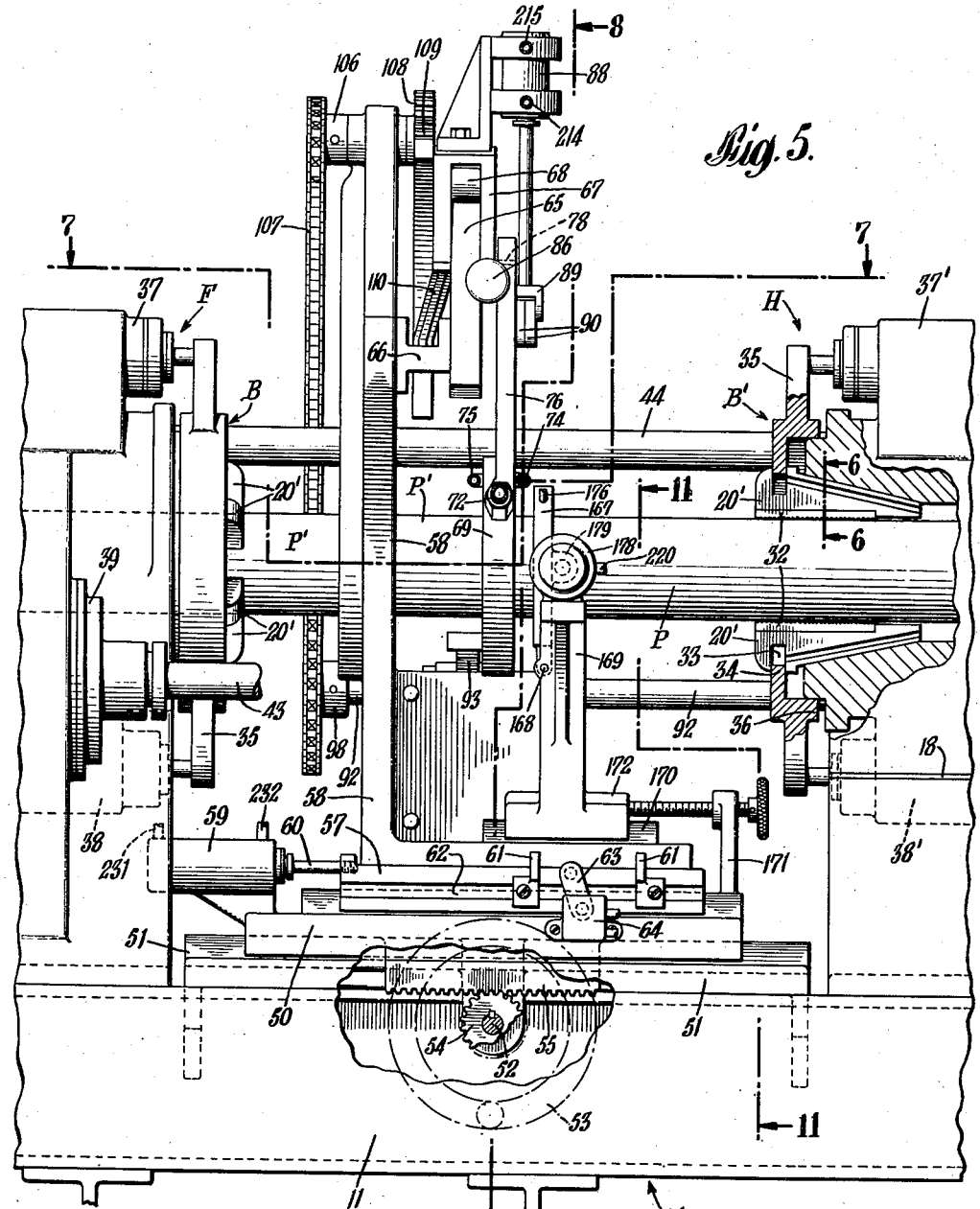
Fig. 5 is an elevation of a longitudinal midportion of the apparatus, parts being broken away, and parts omitted.
Figure 6:
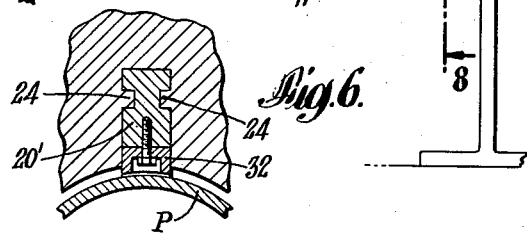
Fig. 6 is a section taken along the line 6—6 of Fig. 5, looking in the direction of the arrows.
Figure 10:
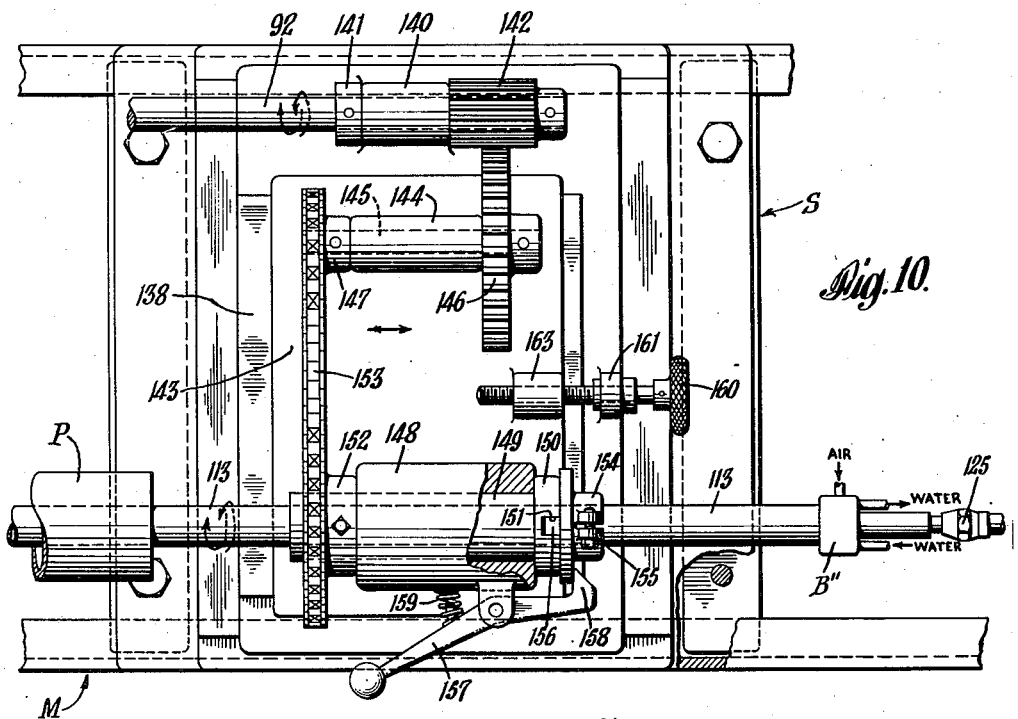
Figure 11:
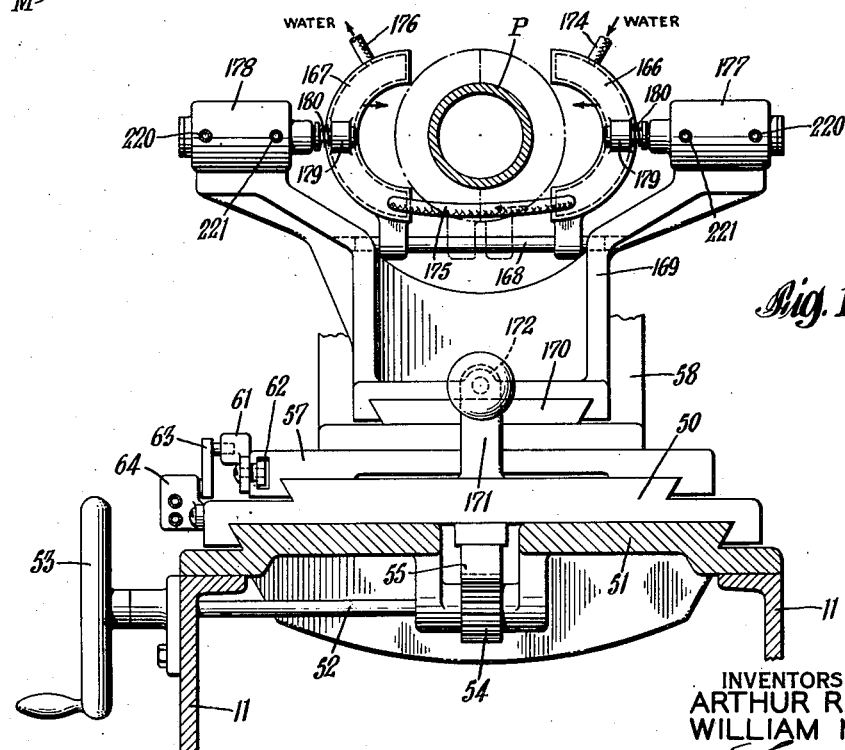
Figure 16:
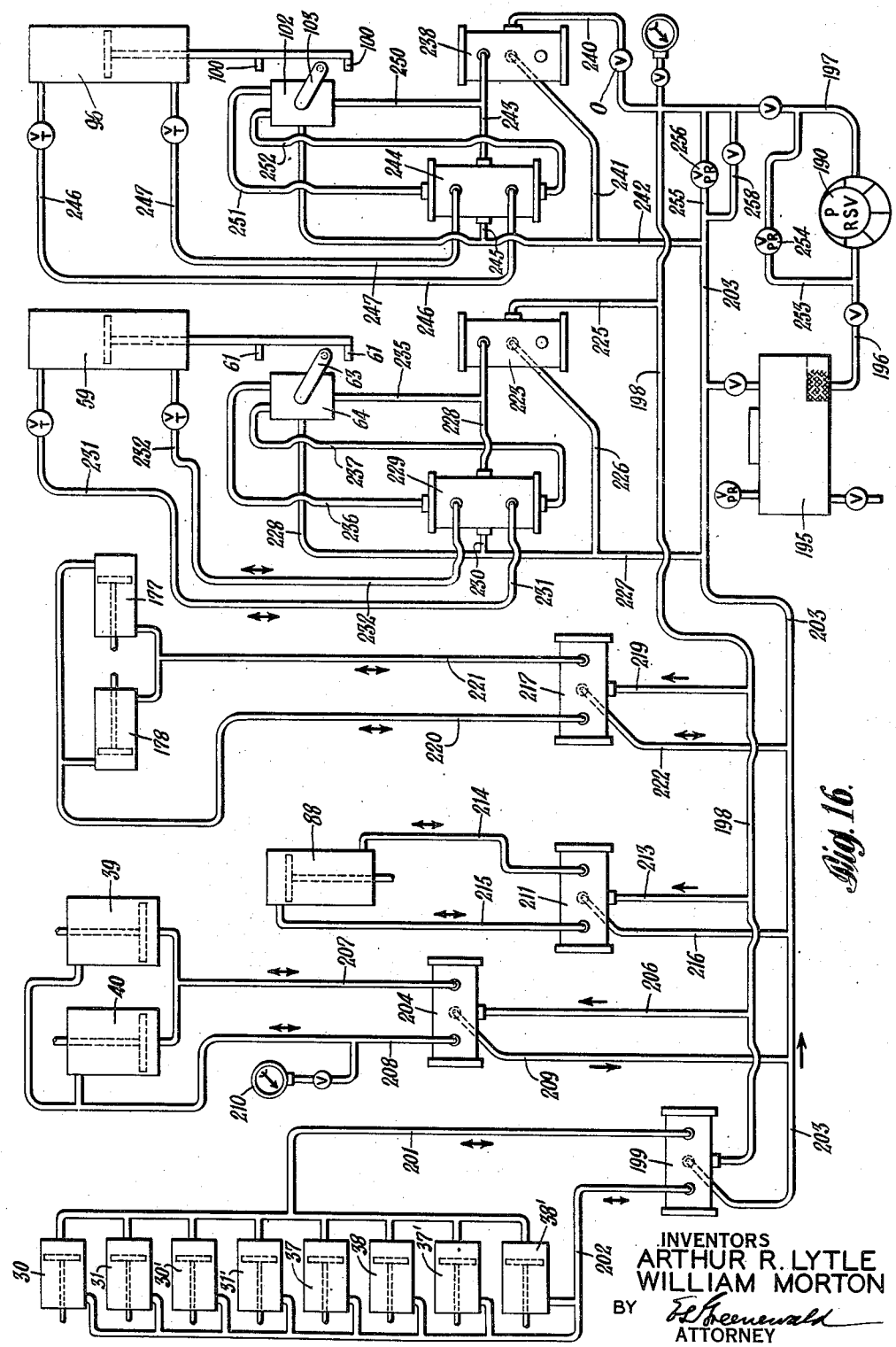
Figure 21:
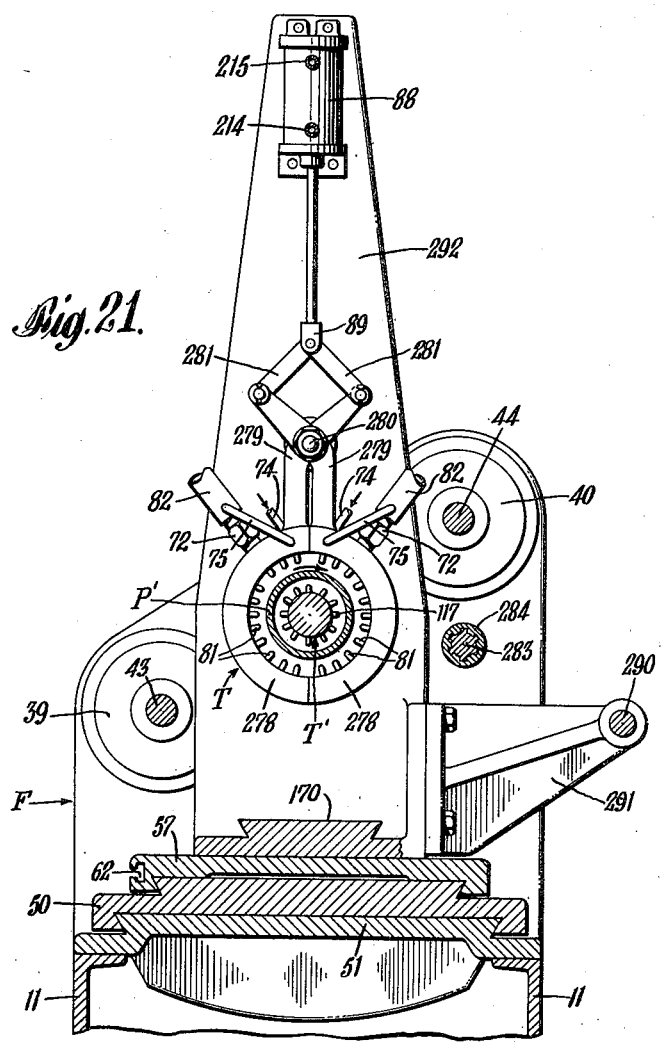
Figure 22:
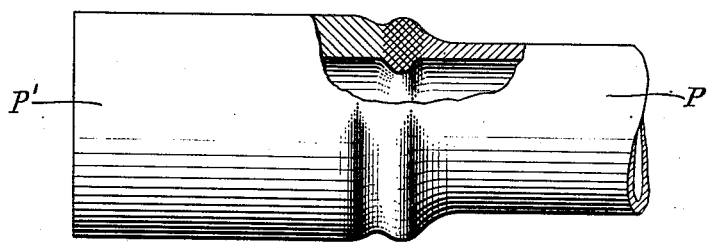

Fig. 5, looking in the direction of the arrows, parts being broken away;

Fig. 9 is a section taken along line 9—9 of Fig. 8, looking in the direction of the arrows;

Fig. 10 is a plan view of inner torch actuating mechanism and associated parts, with parts broken away;

Fig. 11 is a section taken along the line 11—11 of Fig. 5, looking in the direction of the arrows, parts being broken away, and parts omitted;

Fig. 12 is a side elevation of the inner torch assembly, parts being broken away, and parts shown in section;

Fig. 13 and Fig. 14, respectively, are sections taken along the lines 13—13 and 14—14 of Fig. 12, looking in the direction of the arrows;

Fig. 15 is a section taken along the line 15—15 of Fig. 8. parts being omitted;

Fig. 16 is a diagrammatic view of the hydraulic system and associated parts;

Fig. 17 is a side elevation of a modified form of welding apparatus, parts being broken away, and part omitted;

Figs. 18 and 19 are sections taken, respectively, along the lines 18—18 and 19—19 of Fig. 17, looking in the direction of the arrows, parts being omitted;

Fig. 20 is a side elevation of a movable clamping head and associated parts, parts being broken away, and parts shown in section;

Fig. 21 is a section along the line 21—21 of Fig. 17, looking in the direction of the arrows, parts being omitted; and Fig. 22 is a view of a welded joint in the as-welded condition, parts being broken away, and parts shown in section.

Referring to the drawings, the welding apparatus is supported upon a main frame M and a supplemental frame respectively in longitudinal alignment, and made of structural steel members preferably welded together and suitably braced.

For supporting and aligning the pipes being welded a fixed clamping head F is secured upon the main frame at the leaving end; and a movable clamping head H is mounted for longitudinal movement along the frame at the entering end. Mounted on the head F are the controls for the hydraulic operating system, within ready reach of the operator. Longitudinal grooves 18 in the base of head H cooperate with grooves in the upper surface of a support 19 secured to the main frame M, for guiding the head H during longitudinal movement thereof.

For applying high axial pressure to the abutting ends of pipes P, P', to be welded, two hydraulic cylinders 39, 40, mounted upon opposite sides of the fixed head F, have piston rods 43, 44 secured to flange portions 45, 46 of the movable head H. In operation, fluid pressure applied to cylinders 39, 40 forces the movable head toward or away from the fixed head, as desired. The pipes P, P' carried by the respective heads thus are pressed together under any selected pressure; and the pressure is released when desired.

For transmitting axial pressure to the abutting ends of pipes P, P', and for accurately centering the pipes, hydraulically-operated chuck assemblies A and B are mounted on fixed head F; and assemblies A' and B' are mounted on movable head H. (See Fig. 1.) Assemblies A and A', respectively, are similar, and are composed of six longitudinally-groved wedge-shaped centering jaw members 20, each having a soft steel insert 21 adapted to engage the pipes for aligning the latter. The jaws 20 of assemblies AA' extend, respectively, into spaced longitudinal passages within annular collars 22 and 23. Tongues 24 on inner walls of clamping heads F, H cooperate with grooves in the jaws 20 to permit limited sliding movement of a wedge-shaped surface 25 of each jaw 20 along a corresponding surface of said inner walls. An internal flange 26 on collar 22, and a corresponding flange on collar 23, extend into lateral grooves 27 in the various jaw members 20 for controlling movement of the latter.

For moving collars 22, 23, and the associated chuck assemblies A and A' longitudinally of the frame, the respective collars have two arms 28, 29 at opposite sides thereof, connected with the pistons of respective pairs of hydraulic cylinders 30, 31; and 30', 31', respectively carried upon the fixed head F and upon movable head H.

In operation, each chuck assembly functions in well-known manner. Assembly A is shown in Fig. 1 in closed position. To open the assembly A and release a pipe, cylinders 30, 31 are actuated to move the collar 22 to the left. The internal flange 26 on the collar moves the jaws 20 to the left, and also radially outward due to the tongue and groove construction of the jaw members and cooperating parts of the collar. To close the chuck assembly upon a pipe P' this procedure is reversed.

For facilitating the accurate alignment of the pipes P, P', and for gripping the pipes sufficiently to transmit the welding pressure, chuck assemblies B and B' are provided, similar to assemblies A and A' in general construction and operation. In the form shown (see Fig. 5), each assembly B, B' is composed of six jaws 20' having serrated gripping surfaces 32 of hardened steel or the like, and a wedge-shaped surface arranged to slide along a corresponding surface in the respective heads F, H. Each jaw 20' has a groove 33 at its larger end housing an internal flange 34 of a corresponding annular force-transmitting member 35. The respective members 35 are mounted upon corresponding heads F, H; and each has a shoulder 36 cooperating with a shoulder on the corresponding head for limited longitudinal sliding movement. For moving the members 35 and jaws 20' to open and close chuck assemblies B and B', respective pairs of hydraulic cylinders 37, 38; and 37', 38' are mounted, respectively, on opposite sides of movable head H, and of the fixed head F. The pistons of each pair of cylinders are connected with opposite sides of annular members 35, whereby movement of the pistons in one direction causes the jaws to grip the pipes P, P', while movement in the opposite direction releases the pipes.

For controlling movement of the welding torch assemblies, a carriage 50 (see Figs. 5 and 8) is slidable longitudinally of the frame upon grooved guides in a base 51 suitably secured to frame members 11, 11. A shaft 52, operated by handwheel 53 carries a pinion 54 meshing with a rack 55 on carriage 50, whereby operation of handwheel 53 causes the carriage to move longitudinally of frame M. Supported upon carriage 50 for reciprocating movement longitudinally thereof within lateral guide grooves is a plate 57 having secured thereon a vertically-disposed Y-shaped bracket 58, which may be integral therewith. Mounted upon the carriage 50 is a hydraulic cylinder 59 having the usual connections for fluid under pressure. A piston rod 60 connects cylinder 59 with plate 57. Reciprocation of piston rod 60 causes reciprocation of plate 57 and all parts carried thereby.

For controlling the length and location of the path of reciprocation of the plate 57 and associated parts, two adjustable stop members 61, 61 are slidable in a T-shaped groove 62 in the side of plate 57. Each stop member has means for locking it in selected position in said groove; and each has a finger adapted, during movement of the plate 57, to trip the lever 63 of a reversing pilot valve 64 mounted upon the carriage 50.

For supporting a sectional annular torch assembly in spaced relation to the outer peripheral surface of the pipes P and P' at the abutting ends thereof, an arcuate track 65 has its ends secured to the opposite ends of the Y-shaped bracket 58 by members 66. The center of curvature of track 65 coincides with that of the pipe P'. Mounted upon track 65 for movement along the same is a torch carriage 67 carrying rollers 68, 68, 68' adapted to engage opposite surfaces of the track 65 and permit movement of the carriage along the latter.

Supported upon the carriage 67 is a sectional annular, water-cooled torch head T formed of semi-annular torch members 69, 70, each having a passage 71 (see Fig. 15) for a combustible gas mixture provided with an inlet 72; and having a passage 73 for a cooling fluid provided with an inlet 74 and an outlet 75. As best shown in Fig. 8, the respective members 69, 70 are carried upon torch arms 76, 77, each having an end pivotally connected at 78 with a respective spacing block 79, 79 slidable along internal flanges 80 in the lower part of carriage 67. Each of the torch members 69, 70 is provided with a plurality of inwardly-directed torch tips 81, preferably disposed in two laterally-spaced rows, with each tip directed towards the center of curvature of the members 69, 70 (see Fig. 8). The torch tips 81 of each row preferably are staggered with respect to the tips of the adjacent row or rows thereof. Two blowpipes 82, preferably having solenoid-controlled cut-off valves, 82A, are connected respectively with members 69, 70.

For moving the blocks 79, 79 toward and away from each other along the flanges 80, oppositely threaded portions 84, 85 of a rotatable stem 83 cooperate with internally-threaded passages in the respective blocks 79. The stem 83 has a handwheel 86; and is maintained in fixed relation to the carriage 67 by a lug 87 on the latter which contacts with the stem 83 between the threaded portions thereof. Rotation of the stem 83 moves the arms 76, 77 either toward or away from each other to permit spacing of the annular torch head with respect to the pipe surrounded thereby. Mounted upon the torch carriage 67 is a hydraulic cylinder 88 having a piston pivotally connected through a clevis 89 and links 90, 90 with the respective torch arms 76, 77. Operation of the piston causes opening and closing of the torch head members in obvious manner.

For oscillating the annular torch head T circumferentially of the pipe being welded, a bracket 91 is mounted upon bracket 58. Journalled for rotation in the bracket 91 is a shaft 92 carrying a gear 93. Collars on shaft 92, prevent longitudinal movement of the latter relative to bracket 91. Additional brackets 95 support shaft 92 at suitable intervals throughout its length. The bracket 91 supports a hydraulic cylinder 96 having secured to its piston a rack 97, meshing with a gear 93; and a rod 99 having mounted thereon for sliding movement a pair of adjustable stop members 100, 100 carrying means for securing the same in selected position upon the rod. Mounted upon an arm 101 of bracket 91 is a hydraulic reversing valve 102 having a lever arm 103 disposed in the paths of movement of the stop members 100. Reciprocation of the rack 97 causes oscillation of the shaft 92 through a selected arc, depending upon the setting of the stops 100, 100.

For transmitting to the outer torch carriage 67 the oscillatory movement of shaft 92, bracket 58 carries an arm 104 having a shaft 105 journalled thereon. A sprocket 106, secured to shaft 105, has a driving connection, such as chain 107, with a sprocket 98 on shaft 92. Shaft 105 also carries a driven pinion 108 meshing with the teeth of a curved rack 109 which is secured to carriage 67 and braced by flanged connecting member 110.

The arrangement of outer torch head T and associated operating mechanism is such that during operation of hydraulic cylinder 96, the direction of the piston is successively reversed by action of the reversing valve 102 controlled by stops 100. The shaft 92 and interconnected shaft 105 thus are rotated or oscillated along a fixed path of selected lengths, thereby concurrently oscillating the curved rack 109 and the interconnected torch carriage supported on the arcuate track 65. Preferably the gears and sprockets are so chosen that a 12-inch stroke of the piston of cylinder 86 imparts to the torch carriage 67 and outer torch head T an angular motion through a 60° arc.

For directing welding flames upon the inner peripheral margins of the pipes at and adjacent the abutting ends, there is provided an inner torch head T' having a rear block B" and a hollow cylindrical nozzle block N, connected by a fluid-tight casing 113. A cap 114, secured to the forward end of the nozzle block N, forms a forward passage 115 in head T'. The block N has a plurality of spaced radial passages 116 extending through the cylindrical surface, each having an internally threaded portion engaging threads on a corresponding torch tip 117. Preferably the tips are arranged in two laterally-spaced rows, with each tip directed radially of the cylindrical surface of block N. The tips of the respective rows may be staggered, as shown in Fig. 7.

Concentrically arranged within the torch head T' are spaced pipes 118, 119 and 120, each having one end secured within a corresponding stepped well in block B". The opposite end of pipe 118 is secured within the inner cylindrical wall of nozzle block N. The forward end of pipe 119 is secured to block N in manner to establish communication between the passage within pipe 119 and the passage 115.

In the form of the invention shown in Figure 7, the forward end of pipe 120 extends through an aperture in cap 114, and has secured at its forward end a cap 121 with spaced lateral outlets.

In certain modifications of the invention the end of pipe 120 is closed; and that pipe communicates with an annular manifold 121A formed on casing 113 rearwardly of tips 117, and having spaced forwardly directed air outlets, as shown in Fig. 12. Thus, the inner torch assembly is protected from the hot combustion gases. The respective pipes and associated parts define a central passage A"; and passages W, G and W' concentric therewith. Block N has a plurality of spaced longitudinal passages 122 establishing communication between passage 115 and W'. A passage 123 in block B" connects passage A" with a source of air under regulated pressure; a plurality of passages 124, 124 connects passage G with the mixing chamber of an oxy-acetylene blowpipe 125; a passage 127 establishes communication between passage W and a source of cooling fluid under pressure; and a passage 128 connects passage W' with a point of cooling fluid discharge.

For centering the inner torch T' within a pipe P, and for permitting free reciprocation and oscillation of the torch relative to the pipe, one or more torch supports are provided, each including a collar 129 adapted to be secured upon the outer surface of casing 113 by means of a set screw 130 or the like. Mounted for rotation around the collar 129 upon bearings 131 is an annular member 133 having three spaced pairs of members 134 each adapted to house a respective roller 135 for rotation in a plane disposed radially of the casing 113. A retaining ring 136 is secured to member 133.

For supporting, reciprocating and oscillating the inner torch T', a platform 138 is mounted for sliding movement along guides carried on frame S. A pedestal bearing 140 on platform 138 supports shaft 92 for rotation. A collar 141 and a pinion 142 respectively secured upon shaft 92 prevent longitudinal movement of the shaft relative to the bearing 140 and platform 138. A supporting plate 143 is slidable longitudinally of shaft 92 along flanged margins of platform 138. An adjusting screw 160, mounted in a standard 161 on platform 138, has a threaded stem cooperating with an internally threaded aperture in a boss 163 formed on plate 143. Upon rotating the member 160, plate 143 moves along platform 138. The lengths of the paths of reciprocation of the torches T and T' are determined by the location of the stops 61, 61 (Fig. 1). The rate of reciprocation depends upon the setting of flow regulating valves in lines in 231, 232. (See Fig. 16.) A pedestal bearing 144 on plate 143 supports for rotation a stub shaft 145, having secured thereto a gear 146 and a sprocket 147. The gear 146 meshes with pinion 142 at all times. Also mounted upon plate 143 is a pedestal 148 supporting for rotation a short hollow tubular member 149 having an enlarged end 150 provided with a plurality of recesses 151 on its external face. Secured upon member 149 is a sprocket 152 in alignment with sprocket 147 and connected with the latter by a chain 153. A split collar 154, slidable along the casing 113 and having means 155 for clamping the collar in selected position upon that casing, has fingers 156 adapted to enter recesses 151 on the member 149 when casing 113 is moved to the left in Fig. 10. For releasably locking together the collar 154 and member 149, a clamp 157 is pivotally connected to the pedestal 148, and has a finger 158 adapted to engage a flange on collar 154. A spring 159 prevents accidental release of collar 154 by the finger.

The arrangement of parts is such that, when the cylinder 59 is operating, reciprocation of the plate 57 produces reciprocation of the outer torch assembly carried thereby; and such reciprocatory movement may be transmitted to the inner torch assembly, through shaft 92, platform 138, plate 143, member 149, and collar 154.

It will also be apparent from the foregoing description that, when cylinder 96 is operating, the resultant rotation of shaft 92 produces oscillation of outer torch assembly T through sprockets 98, 106, pinion 108, rack 109, and torch carriage 67. Moreover, when the clamp 157 is in locked position, oscillation of the inner torch assembly T' is concurrently produced, through pinion 142, gear 146, sprockets 147 and 152, member 149, and collar 154. The length of the arc of oscillation of the torch assemblies is regulated by the stops 100, 100 on shaft 99. The rate of oscillation is controlled by the setting of flow regulating valves in lines 246, 247.

For supporting incoming pipe P to be welded, and out-going welded pipe P', roller type supports are provided at spaced points at each end of the main frame M. A suitable type of support, shown in Fig. 1, consists of a welded pedestal frame carrying a vertically-adjustable member 164 having a grooved roller 165 journalled thereon.

As best shown in Fig. 11, for applying a cooling medium to one of the pipes immediately adjacent the welding zone, a pair of hollow cooling members 166, 167 are slidable transversely of the pipes being welded, upon a guide rod 168 supported at its ends on a bracket 169. The latter is slidable upon a plate 170 secured to bracket 58. For moving the cooling members longitudinally of pipe P, the bracket 169 is connected with carriage 50 by an adjusting screw bracket 171 mounted on the latter, and an adjusting screw stem, cooperating with internal threads in a boss 172 on bracket 169. A cooling fluid enters cooling member 166 through inlet 174, flows therefrom to member 167 through flexible hose 175, and thence flows through outlet 176. For moving the members 166, 167 into and out of contact with the outer wall of a pipe P, hydraulic cylinders 177, 178 carried by bracket 169 have piston rods respectively extending through apertures within lugs 179 on members 166, 167, said piston rods having enlarged ends. Coil springs 180, operatively interposed between said piston rods and lugs, act yieldingly to press the cooling members against the pipe P. The cooling members are held in contact with the pipe under a low pressure, permitting the pipe to rotate relative to said members. The parts of said members contacting the pipe may be faced with wear-resistant metal, or may have replaceable shoes of such metal.

If desired, a simple sectional cooling coil or a grooved open ring may be detachably secured to a pipe at the point to be cooled, and a cooling fluid conducted to and from the same by suitable means.

For cutting off the gas flow to the outer and inner torch assemblies T, T', when the portion of the pipes held between the clamp assemblies B, B' has been upset or shortened a preselected amount, a bracket 182 (see Fig. 1) on fixed head F houses a rod 183 for sliding movement, and has a set screw for locking the rod to the bracket 182. The opposite end of rod 183 is guided for free sliding movement within one arm of a bracket 185 carried by the movable head H. A limiting switch 186 is movable on bracket 185 under action of an adjusting screw 187 supported on the latter. The switch 186 is connected in an electrical circuit having therein solenoid-controlled cut-off valves, respectively controlling gas flow to the torches T, T'.

In the form of the invention illustrated, the various pipe clamping and pressure applying mechanisms, the torch oscillating and reciprocating mechanism, the outer torch closing mechanism, and the cooling clamp operating mechanism, are actuated by fluid pressure in a hydraulic system shown diagrammatically in Fig. 16. Referring to that figure, 195 designates a storage tank for a pressure fluid, such as a suitable hydrocarbon oil. For maintaining a suitable pressure in the system, a pump 190, driven from a suitable source of power, has its intake connected with tank 195 through valve-controlled conduit 196. An electric switch 191 for starting and stopping the motor operating pump 190 is mounted on fixed head F. A discharge conduit 197 leads from the pump to a conduit 198 having therein a four-way cut-off valve 199, operated by a lever 200 (see Fig. 1), for applying pressure to either side of the pistons of chuck-operating cylinders 30, 31; 30', 31'; 37, 38; and 37', 38', through lines 201, 202. A fluid return line 203 and a valve-controlled branch line connects valve 199 to tank 195.

A four-way cut-off valve 204, controlled by a lever 205 (see Fig. 1), has an inlet line 206 connected with conduit 198, and has outlet lines 207, 208, respectively communicating with the opposite ends of respective main welding pressure cylinders 39, 40; and has an outlet line 209 connected with line 203. A pressure gauge 210 is in line 208.

For actuating the outer torch closing mechanism a four-way cut-off valve 211, controlled by a lever 212, has an inlet line 213 connected with conduit 198, and has selective outlet lines 214, 215 communicating with the opposite ends of torch-closing cylinder 88; and has an outlet line 216 connected with conduit 203.

For actuating the cooling clamp means, a four-way cut-off valve 217 having a handle 218 (see Fig. 1) has an inlet line 219 connected with conduit 198; and has outlet lines 220, 221 selectively connected with opposite ends of cooling clamp-operating cylinders 177, 178; and has an outlet line 222 connected with conduit 203.

For effecting reciprocation of the carriage supporting the torches, a valve 223 controlled by a handle 224 (see Fig. 1) has its inlet connected by line 225 with conduit 198; and has an outlet communicating through lines 226, 227 with return line 203. Valve 223 also has an outlet line 228 connected with a pilot-operated reversing valve 229. The latter has selective outlet lines 231, 232 respectively connecting line 228 selectively with one of the opposite ends of torch carriage-reciprocating cylinder 59; and a line 230 concurrently connecting the other of the conduits 231, 232 with lines 227. Lines 231, 232 respectively contain throttle valves for regulating the rate of reciprocation of the torch carriage.

The outlet valve 223 also communicates through line 235 with the inlet to the torch carriage-reversing valve 64. The outlet of valve 64 communicates with return line 203 through line 227; and with valve 229 through the respective lines 236, 237.

For effecting regulated oscillation of the welding torches, when desired, a valve 238, controlled by a handle 239 (see Fig. 1), has its inlet connected with conduit 198 by line 240 having therein a cut-off valve O; and has an outlet communicating through lines 241, 242, with return line 203. Valve 238 also has an outlet line 243 connected with a pilot-operated reversing valve 244. Outlet lines 246, 247 selectively connect line 243 through valve 244 with the opposite ends of torch-oscillating cylinder 96; and line 245 concurrently connects the other line 246 or 247, with line 242 through the valve 244. Lines 246, 247, respectively contain throttle valves for regulating the rate of oscillation of the torch carriage. The outlet from valve 238 also communicates through line 250 with the inlet to the torch-oscillating valve 102. Outlets from valve 102 respectively communicate with return line 203 through line 242; and with valve 244 through respective lines 251, 252.

A bypass line 253 having therein a pressure-relief valve 254 connects lines 196 and 197; and a bypass line 255 having therein a pressure-relief valve 256 connects the lines 197 and 203. Valve 256 is bypassed in turn by valve-controlled line 258. Cut-off valves and pressure gauges preferably are placed in the system at the points indicated in Fig. 16. The tank 195 also is provided with vent, a valve-controlled drain line, and a filter screen at the inlet to line 196.

A modified form of apparatus is shown in Figs. 17 to 21. This apparatus is in general similar to that shown in Figs. 1 to 15, but differs from the latter in being designed to permit rotation of the pipes being butt-welded during that operation. In this modification, the fixed head, movable head, and associated parts; the means for moving the heads towards and away from each other; the means for permitting the regulated reciprocation of the inner and outer torch assemblies in unison; and the means for applying a cooling fluid to the work, when desired, are in general similar to corresponding parts of Figs. 1 to 15. Each of the heads F, H, includes a longitudinally-disposed pipe housing 260, as best shown in Fig. 20. Mounted for rotation within the latter is a tubular chuck body 262 having at one end thereof spaced radial slots, each forming an internal wedge-shaped clamping face 263. A short tubular chuck body 264 is secured by key 265 to the end of the chuck body 262 for rotation therewith. Chuck body 264 has at its opposite end a plurality of spaced radial slots each having a wedge-shaped clamping face 266 similar to faces 263. Chuck bodies 262 and 264 are rotatable relative to housing 260 upon roller bearings 267, 267, and radial thrust bearings 268. Bearings 267 are secured in position by bronze thrust washers 269 and by threaded retaining members 270 secured to chuck body 262. The chuck assemblies A, B, and A', B' and associated parts are similar in general to the corresponding assemblies shown in Fig. 1.

As best shown in Fig. 20, for moving the gripping members of each assembly B, B', longitudinally of a pipe to connect and disconnect the chuck body and the latter, a rotatable annular ring 271 in each of the heads F, H, is keyed to the chuck body 262 of each assembly B, B', by a Woodruff key 272 for rotation with that chuck body. Each ring 271 has an internal flange 273 extending within a groove in each gripping member 20'; and has a pair of spaced annular flanges housing the inner margin of a split pressure ring 274 connected with the pistons of cylinders 37, 38; 37', 38'. A bronze thrust bearing is disposed between each ring 274 and one of said flanges.

Similarly, in each head a rotatable annular sliding cap 275, keyed to chuck body 264 for rotation therewith, has an internal flange 276 extending within a groove in each of the members 20 of assemblies A, A'. Each cap 275 has two spaced external flanges adapted to house for sliding movement therebetween the inner margin of a split pressure ring 277 connected with the pistons of cylinders 30, 31; 30', 31'. A bronze thrust bearing is disposed between each ring 277 and one of said flanges.

As best shown in Fig. 21, torch sections 278', 278', similar to members 69, 70 of Fig. 8, have arms 279' pivotally mounted on a pin 280' secured to the torch bracket 292. The other end of each arm is pivotally connected with a respective link 281'. Each of the latter is pivotally connected, through a clevis, with the piston of hydraulic cylinder 88.

In the form of apparatus shown in Fig. 17, reciprocation of the inner torch assembly is effected by a connecting rod 290 secured to an arm 291 on outer torch supporting bracket 292, and having an end secured to a bracket 293 supported upon slidable plate 138 similar to plate 138 of Fig. 10. Mounted upon a plate 143 slidable on plate 138 is a pedestal 297 and associated parts. Means such as previously described are provided for releasably securing the inner torch assembly T' to pedestal 297.

For rotating the members being welded, an electric motor 278 is mounted on fixed head F, and is connected through pinion 279 with a ring gear 280 keyed to chuck body 262 of head F. Gear 280 meshes with a pinion 281 keyed to a drive shaft mounted for rotation on bearings (not shown) supported on heads F, H. (See Fig. 18.) The shaft is formed of two sections 282, 283, connected by a splined coupling 284 whereby rotation of the shaft is effected during relative longitudinal movement of the shaft sections. A ring gear 285 is keyed to chuck body 262 of head H, and meshes with a pinion 286 secured to shaft 283.

During operation of the apparatus shown in Figs. 1 to 16, pipes P, P' are positioned in heads H, F, with an end of each pipe in abutting relation. Actuation of valve 199 aligns the pipes and clamps the same securely within the heads H, F. Actuation of valve 204 then forces the ends of the pipes together under a selected pressure. Valve 211 then is operated to close the outer torch head around the abutting ends of the pipe. The inner torch head T' is then moved into the pipe P to bring the torch tips opposite the abutting ends of the pipes. Longitudinal adjustments of the torch heads T, T' are made, respectively, by means of hand wheel 53, and adjusting screw 160. Torch T' is secured for movement with plate 143. After lighting the torches T, T', concurrent reciprocation of the torch assemblies T, T' across the joint along a fixed selected path is now effected by opening valve 223. Opening of valve 238 causes oscillation of the torch assemblies T, T', when such movement is desired.

When the heat thus applied to the abutting ends of the pipes has produced a selected amount of upsetting of the metal under high pressure concurrently applied, the rod 183 trips switch 186 and cuts off the flow of welding gases to the torches T, T'. The pressure preferably is continued during the initial cooling stages, after which it is released, and the welded pipe withdrawn.

In the modification shown in Figs. 17 to 21, after the pipes are clamped in position, the welding pressure applied, and the torches adjusted, operation of motor 278 causes rotation of pipes P, P'. Oscillation of the torches is not necessary. Reciprocation thereof is effected by opening valve 223 (see Fig. 16). Simple means for opening and closing a sectional outer torch assembly may be substituted for that shown in Fig. 8. Such a means is shown in Fig. 21, and includes a sectional annular torch assembly T having supporting arms pivoted upon a bracket 295 mounted on plate 57, the opposite ends of the arms being pivoted upon links connected with the piston of hydraulic cylinder 88.

Suitable pipe supports are provided at spaced points for supporting pipes P, P' for rotation on their common axis.

When pressure butt-welding flat articles such as metal plates, torch heads having a plurality of aligned torch tips are directed upon the respective upper and lower aligned surfaces of the articles, and may be supported respectively by plate 57 for limited reciprocating movement transversely of the latter, under action of hydraulic cylinder 96 and associated parts. Suitable mechanism similar to that hereinbefore described may be used for aligning the said plates, and for forcing them together under pressure; and for reciprocating each torch head across the interface of the abutting articles.

The following exemplifies the practice of the invention for butt-welding together (1) an oil well drill pipe made of Class "D" seamless steel tubing having an ultimate tensile strength of 104,000 pounds per square inch, and a yield point of 68,000 pounds per square inch, and having the end to be welded upset to an outside diameter of 5 inches and a wall thickness of 5/8 inch; and (2) a tapered "one-half tool joint" made of nickel-chromium steel and having the smaller tapered end, to be joined to the drill pipe, 5 inches in outside diameter and 5/8 inch in wall thickness. Such a welded joint, prior to machining off the excess upset metal, is illustrated in Fig. 22. During welding the prepared ends to be butt-welded were forced together under a pressure of about 2500 pounds per square inch while maintained in accurate alignment. The inner and outer torch assemblies were directed almost entirely upon the tool joint side of the joint until a dull red heat had been reached, during which time the torch heads were reciprocated across the joint over a path ½ inch in length. The center of reciprocation was then gradually shifted to equalize the temperature in the abutting ends of the drill pipe and tool joint, being kept over the shifting interface between the members being welded, while heating the metal adjacent the abutting ends to a temperature of about 1200° C. The metal at the joint gradually upset under the aforesaid pressure, with a shortening of the members. The welding torches were cut off when a shortening of the members at the joint of 1⅛ inch had been attained. During application of the welding flames, a cooling fluid was circulated around the drill pipe in a cooling block located at the base of the taper in the drill pipe near the joint, thereby preventing flaring of the pipe. Following the welding step, the metal within one inch of the welded joint on either side thereof was raised to around 845° C. and heat-treated at that temperature for about five minutes, after which the joint was allowed to cool in air.

The welded joint thus produced—illustrated in Fig. 22—had the following properties:

Yield point_____pounds per sq. in__ 69,400
Ultimate tensile strength_____do____ 106,000
Bend elongation (½ inch)_____per cent__ 34
Izod impact values, notched along weld junction, in ft.-lb_____ 28.0
Izod impact values, ¼ inch from joint in ½ tool joint material, in ft.-lb_____ 33.0
Izod impact values, ¼ inch from joint in drill pipe material, in ft.-lb_____ 27.0

Samples used for the Izod tests were 1 centimeter square in section, and had therein V-notches 1 millimeter deep.

Hardness tests showed no appreciable softening or hardening of the metal at the joint as a result of the welding operation.

The invention is susceptible of modification within the scope of the appended claims.

We claim:

1. Butt-welding apparatus comprising means for holding two members of weldable metal in longitudinal alignment with an end of each in abutting relation; means for forcing said abutting ends together under high pressure while thus aligned; heating means directing upon said members a plurality of closely spaced welding flames substantially surrounding the members at and adjacent the abutting ends, said heating means being formed of sections retractible as a unit from said members in a direction transversely of the latter; means pivotally interconnecting the sections of said heating means for concurrently positioning the respective sections as a unit in selected operative relation with said members adjacent the abutting ends and for retracting said sections as a unit from such ends; and means for reciprocating the sections of said heating means as a unit across the interface formed by said abutting ends along a selected path of fixed length.

2. Butt-welding apparatus including a supporting frame; aligned means supported by the frame and adapted to hold two tubular members in longitudinal alignment with an end of each in abutting relation; means for forcing said members together under high pressure while thus aligned; heating means concurrently directing welding flames upon the respective outer and the inner peripheral surfaces of said members adjacent the abutting ends; means for reciprocating each of said heating means across the abutting ends of said members along selected paths of fixed lengths; and means for regulating the amplitude of the paths of reciprocation of the respective heating means.

3. Apparatus as defined in claim 2, together with means effecting relative movement between each of the respective heating means and said tubular members along a curved path in a plane transversely of the longitudinal axis of the aligned members.

4. Apparatus for welding together the ends of tubular members of weldable metal, which comprises mechanism for longitudinally aligning said members and for continuously maintaining the opposed ends thereof in abutting relation during a welding operation; means for applying pressure to the abutting ends of said members while thus aligned; outer torch means for directing welding flames upon the outer peripheral surfaces of said members adjacent said abutting ends; independently-controlled inner torch means for directing welding flames upon the inner peripheral surfaces of said members adjacent said abutting ends, and means for reciprocating said outer and said inner torch means as a unit across the interface formed by the abutting ends of the members.

5. Apparatus for welding together the ends of tubular members of weldable metal, which comprises mechanism for longitudinally aligning said members and for continuously maintaining the opposed ends thereof in abutting relation during a welding operation; means for applying pressure to the abutting ends of said members while thus aligned; outer torch means for directing welding flames upon the outer peripheral surfaces of said members adjacent said abutting ends; independently-controlled inner torch means for directing welding flames upon the inner peripheral surfaces of said members adjacent said abutting ends; and means for reciprocating as a unit both the outer and inner torch means longitudinally of said members across the abutting ends along fixed paths of selected length.

6. Apparatus for welding together the ends of tubular members of weldable metal, which comprises mechanism for longitudinally aligning said members and for continuously maintaining the opposed ends thereof in abutting relation during a welding operation; means for applying pressure to the abutting ends of said members while thus aligned; outer torch means for directing welding flames upon the outer peripheral surfaces of said members adjacent said abutting ends; independently-controlled inner torch means for directing welding flames upon the inner peripheral surfaces of said members adjacent said abutting ends; means for reciprocating both the outer and inner torch means longitudinally of said members along fixed paths; and means for regulating as a unit the lengths of the paths of reciprocation of said outer and inner torch means.

7. Butt-welding apparatus including a supporting frame, aligned means supported by the frame and adapted to hold two tubular members in longitudinal alignment with an end of each in abutting relation; means for forcing said members together under high pressure while thus aligned; heating means respectively directing welding flames upon the outer and inner peripheral surfaces of said members adjacent the abutting ends, and means for oscillating the heating means and welding flames along a curved path adjacent said surfaces while so directed.

8. Apparatus for welding together the ends of tubular members of weldable metal, which comprises mechanism for longitudinally aligning said members and for continuously maintaining the opposed ends thereof in abutting relation during a welding operation; means for applying pressure to the abutting ends of said members while thus aligned; outer torch means for directing welding flames upon the outer peripheral surfaces of said members adjacent said abutting ends; independently-controlled inner torch means for directing welding flames upon the inner peripheral surfaces of said members adjacent said abutting ends; and means for effecting relative movement between the tubular members and the respective torch means in a curved path coaxial with the longitudinal axis of said tubular members.

9. Butt-welding apparatus including a frame; means supported by the frame adapted to hold two members of weldable metal in longitudinal alignment with an end of each in abutting relation; means for forcing said abutting ends together under high pressure while thus aligned; heating means respectively directing a plurality of groups of closely spaced welding flames upon opposite surfaces of said members and substantially surrounding said members in the same transverse plane therethrough, adjacent the abutting ends; means for reciprocating each of said groups of flames longitudinally of said members along a fixed path of selected length; and means for concurrently moving each of said groups of flames back and forth transversely of said members along a fixed path of selected length.

10. Apparatus for butt-welding tubular members, comprising the combination of a torch support adapted to be reciprocated longitudinally of the tubular metal members to be joined; means for reciprocating said support; torch means carried by said support and adapted to be reciprocated across the abutting ends of said members for supplying welding heat, said torch means comprising a sectional annular torch head adapted to direct welding flames upon the outer peripheral surfaces of said members; means operatively associated with said torch support for oscillating said annular torch head along a fixed path of selected length around an axis of oscillation coaxial with said tubular members; an inner torch head adapted to direct welding flames upon the inner peripheral surfaces of said members adjacent the abutting ends; means detachably connecting said torch support and said inner torch head for reciprocating the latter in unison with said support; and means for oscillating said inner torch head in unison with said outer torch head.

11. Apparatus for butt-welding tubular members, which comprises means for clamping two longitudinally-aligned tubular members with an end of each in abutting relation; means for forcing the abutting ends together under high pressure while maintaining longitudinal alignment of said members; means for rotating said members while thus aligned and under pressure; means for applying welding heat to the abutting ends of said members, the last-named means comprising torches respectively directing welding flames upon the outer and inner peripheral surfaces of said members adjacent said abutting ends; means for reciprocating both the outer and inner torches as a unit longitudinally of said members across the abutting ends thereof; and means for regulating the amplitude of the paths of reciprocation of said torches.

12. Apparatus for welding together the ends of tubular members of weldable metal, which comprises mechanism for longitudinally aligning said members and for continuously maintaining the opposed ends thereof in abutting relation during a welding operation; means for applying pressure to the abutting ends of said members while thus aligned; outer torch means for directing welding flames upon the outer peripheral surfaces of said members adjacent said abutting ends; independently-controlled inner torch means for directing welding flames upon the inner peripheral surfaces of said members adjacent said abutting ends; and automatic means operatively associated with each of said members and with each of said torch means and adapted upon a preselected shortening of the metal members for cutting off the fuel gas and oxygen to each of said torch means.

13. Apparatus for welding together the ends of tubular members of weldable metal under high pressure, which comprises mechanism for longitudinally aligning said members and for continuously maintaining the opposed ends thereof in abutting relation during a welding operation; means for applying high pressure to the abutting ends of said members while thus aligned; outer torch means for directing welding flames upon the outer peripheral surfaces of said members at and adjacent said abutting ends; independently controlled inner torch means for directing welding flames upon the inner peripheral surfaces of said members at and adjacent said abutting ends; and automatic means operative upon a preselected shortening of the metal members for discontinuing the pressure welding operation.

14. Apparatus for welding together two members of weldable metal, one of which members has a wall thickness less than the wall thickness of the other member, which comprises mechanism for longitudinally aligning said members with a surface of each continuously in abutting relation during a welding operation; means for forcing the abutting surfaces of said members together under high pressure while thus aligned; outer torch means for directing welding flames upon the outer peripheral surfaces of said members in a welding zone at and adjacent said abutting surfaces; inner torch means for directing welding flames upon the inner peripheral surfaces of said members in a welding zone at and adjacent said abutting surfaces; means for reciprocating said outer and inner torch means across the interface formed by said abutting surfaces; and means operatively associated with the member of lesser wall thickness adjacent said interface for rapidly conducting heat therefrom, thereby preventing flaring of the last-named member at points remote from said interface and welding zones during the application of heat and pressure.

15. Butt-welding apparatus including a supporting frame; aligned means supported by the frame and adapted to hold two tubular members in longitudinal alignment with an end of each in abutting relation; means for forcing said members together under high pressure while thus aligned; heating means concurrently directing welding flames upon the respective outer and the inner peripheral surfaces of said members adjacent the abutting ends; means for reciprocating each of said heating means across the abutting ends of said members along selected paths of fixed lengths; means for regulating the amplitude of the paths of reciprocation of the respective heating means; and means for applying a cooling medium to the surface of at least one of said members adjacent said abutting ends.

16. Apparatus for welding together the ends of tubular members of weldable metal, which comprises mechanism for longitudinally aligning said members and for continuously maintaining the opposed ends thereof in abutting relation during a welding operation; means for applying pressure to the abutting ends of said members while thus aligned; outer torch means for directing welding flames upon the outer peripheral surfaces of said members adjacent said abutting ends; independently-controlled inner torch means for directing welding flames upon the inner peripheral surfaces of said members adjacent said abutting ends; means for reciprocating as a unit both the outer and the inner torch means longitudinally of said members across the abutting ends along fixed paths of selected length; and means for applying a cooling medium to the surface of at least one of said members adjacent said abutting surfaces thereof.

17. Process for butt-welding tubular members of weldable metal having different wall thicknesses, which comprises longitudinally aligning two of such members having different wall thicknesses with an end of each in abutting relation, forcing said ends together under pressure while directing upon the outer surface of the member of greater thickness adjacent the abutting ends a group of welding flames encircling said member, concurrently directing a second group of welding flames upon the inner periphery of said member of greater thickness adjacent the abutting ends; while said flames are so directed, reciprocating said flames across the interface formed by the abutting surfaces along selected paths of fixed length; and after the metal of the member of greater wall thickness adjacent said abutting ends has reached a dull red heat but before substantial upsetting of metal occurs, shifting the centers of reciprocation of the said groups of flames toward the interface between the abutting ends to equalize the temperatures in the respective members at said interface, thereby uniformly heating said abutting ends to a welding temperature, upsetting metal and shortening said members.

18. Process for butt welding a tool joint to an end of a drill pipe having a wall thickness less than the wall thickness of said tool joint, which comprises aligning said tool joint and drill pipe with an end of each in abutting relation; forcing said ends together under pressure while directing welding flames upon and encircling the outer surface of said tool joint adjacent the interface formed by the abutting ends, and while directing welding flames upon the inner periphery of said tool joint adjacent said interface; after said tool joint has reached a dull red heat adjacent said interface but before substantial upsetting of metal occurs, adjusting the outer and inner welding flames to equalize the temperatures of the tool joint and drill pipe at and adjacent said interface thereby heating the metal at said interface to a welding temperature, while preventing flaring of said drill pipe under said pressure, and thereafter discontinuing the application of the welding flames.

19. Process for butt welding a tool joint to an end of a drill pipe having a wall thickness less than the wall thickness of said tool joint, which comprises aligning said tool joint and drill pipe with an end of each in abutting relation; forcing said ends together under pressure while directing welding flames upon and encircling the outer surface of said tool joint adjacent the interface formed by the abutting ends, and while directing welding flames upon the inner periphery of said tool joint adjacent said interface; after said tool joint has reached a dull red heat adjacent said interface but before substantial upsetting of metal occurs, adjusting the outer and inner welding flames to equalize the temperatures of the tool joint and drill pipe at and adjacent said interface, thereby heating the metal at such interface to a welding temperature, while applying a cooling medium to said drill pipe adjacent said interface, thereby preventing flaring of said drill pipe under said pressure, and thereafter discontinuing the application of the welding flames.

20. Process for butt-welding tubular members of weldable metal having different wall thicknesses, which comprises longitudinally aligning two of such members having different wall thicknesses with an end of each in abutting relation, forcing said ends together under pressure while directing upon the outer surface of the member of greater thickness adjacent the abutting ends a group of welding flames encircling said member, concurrently directing a second group of welding flames upon the inner periphery of said member of greater thickness adjacent the abutting ends; while said flames are so directed, reciprocating said flames along selected paths of fixed length; after the metal of the member of greater wall thickness adjacent said abutting ends has reached a dull red heat but before substantial upsetting of metal occurs, shifting the centers of reciprocation of the said groups of flames toward the interface between the abutting ends to equalize the temperatures in the respective members at said interface, thereby uniformly heating said abutting ends to a welding temperature, upsetting metal and shortening said members and during the application of said flames applying a cooling medium to the surface of the member of lesser wall thickness adjacent the abutting ends of said members, thereby confining the upset metal to a narrow zone imediately adjacent said abutting ends.

ARTHUR R. LYTLE.
WILLIAM MORTON.